(12) United States Patent
Kowalczyk et al.

(10) Patent No.: US 10,217,244 B2
(45) Date of Patent: Feb. 26, 2019

(54) METHOD AND DATA PROCESSING DEVICE FOR COMPUTER-ASSISTED HAIR COLORING GUIDANCE

(71) Applicant: Henkel AG & Co. KGaA, Duesseldorf (DE)

(72) Inventors: Thomas Kowalczyk, Wuppertal (DE); Gesa Geissel, Duesseldorf (DE); Lars Reinartz, Moenchengladbach (DE); Bernd Braβel, Moenchengladbach (DE)

(73) Assignee: Henkel AG & Co. KGaA (DE)

( * ) Notice: Subject to any disclaimer, the term of this patent is extended or adjusted under 35 U.S.C. 154(b) by 0 days.

(21) Appl. No.: 15/476,646

(22) Filed: Mar. 31, 2017

(65) Prior Publication Data
US 2017/0206678 A1 Jul. 20, 2017

Related U.S. Application Data

(63) Continuation of application No. PCT/EP2015/071839, filed on Sep. 23, 2015.

(30) Foreign Application Priority Data

Oct. 2, 2014 (DE) .................. 10 2014 220 077

(51) Int. Cl.
*G06K 9/62* (2006.01)
*G06K 9/00* (2006.01)
(Continued)

(52) U.S. Cl.
CPC ........ *G06T 11/001* (2013.01); *G06K 9/00281* (2013.01); *G06K 9/4652* (2013.01);
(Continued)

(58) Field of Classification Search
CPC combination set(s) only.
See application file for complete search history.

(56) References Cited

U.S. PATENT DOCUMENTS 6,719,565 B1 * 4/2004 Saita .................... A45D 44/005
428/42.3
9,142,054 B2 * 9/2015 Mallick ................. G06T 11/001
(Continued)

FOREIGN PATENT DOCUMENTS

CA    2651539 A1    1/2010
EP    1147722 A1    10/2001

OTHER PUBLICATIONS

PCT International Search Report (PCT/EP2014/071839) dated Dec. 21, 2015.

*Primary Examiner* — Wesner Sajous
(74) *Attorney, Agent, or Firm* — James J. Cummings

(57) ABSTRACT

A method for computer-assisted hair coloring guidance includes the step of determining a hair section area, in which hair is depicted, in a digital image of a person where a plurality of hairs are visible. Determining this hair section area can include the step of determining an image color information frequency distribution which can correspond to a frequency distribution of at least one item of color information for a plurality of image points in the digital image; as well as the step of comparing this frequency distribution of image color information to hair color statistics, where the hair color statistics may include, for each of a plurality of hair colors, at least one frequency distribution of at least one item of hair color information.

15 Claims, 7 Drawing Sheets

(51) Int. Cl.

| | | |
|---|---|---|
| *G06K 9/38* | (2006.01) | |
| *G09G 5/02* | (2006.01) | |
| *H04N 1/60* | (2006.01) | |
| *G06T 11/00* | (2006.01) | |
| *G06K 9/46* | (2006.01) | |
| *H04N 1/56* | (2006.01) | |
| *G06T 7/90* | (2017.01) | |
| *G06T 7/11* | (2017.01) | |
| *G06Q 50/10* | (2012.01) | |

(52) U.S. Cl.
CPC ........... *G06K 9/6212* (2013.01); *G06Q 50/10* (2013.01); *G06T 7/11* (2017.01); *G06T 7/90* (2017.01); *H04N 1/56* (2013.01); *H04N 1/6027* (2013.01); *G06T 2207/10024* (2013.01); *G06T 2207/30201* (2013.01)

(56) References Cited

U.S. PATENT DOCUMENTS

| | | | |
|---|---|---|---|
| 2007/0100555 A1* | 5/2007 | Ladjevardi | G01N 21/84 |
| | | | 702/1 |
| 2010/0128141 A1* | 5/2010 | Jang | G06K 9/6212 |
| | | | 348/222.1 |
| 2011/0194762 A1* | 8/2011 | Haibing | G06K 9/00281 |
| | | | 382/165 |
| 2012/0075331 A1* | 3/2012 | Mallick | G06T 11/001 |
| | | | 345/594 |
| 2015/0091938 A1* | 4/2015 | Mallick | G06T 11/001 |
| | | | 345/595 |
| 2017/0156476 A1* | 6/2017 | Miklatzky | A45D 44/005 |

\* cited by examiner

METHOD AND DATA PROCESSING DEVICE FOR COMPUTER-ASSISTED HAIR COLORING GUIDANCE

FIELD OF THE INVENTION

The present invention generally relates to computer-assisted hair coloring guidance.

BACKGROUND OF THE INVENTION

Computer-assisted hair coloring guidance may be used, for example, to give a user a visual impression of how he/she would look with a selected desired hair color. For example, in a digital image of the user in which the user's hair, among other things, is visible, a region of the image may be determined in which hair is depicted. This hair region may be recolored in the desired hair color.

Some conventional programs determine the hair region of a digital image, for example, by determining a frequency distribution of color values of individual pixels of the digital image. A subgroup of the pixels, for example a group of pixels which lie in a color space close to a color value of a hair color that is manually preselected, for example, may be associated with the hair region.

Other conventional programs may utilize a hair structure, for example a spatial proximity and/or a linear course of pixels of the same or similar color, in order to identify the hair region, for example in particular portions of the hair that are not depicted as a closed surface, such as hair strands. Other conventional programs may combine color information and structure information.

However, in determining the region in which hair is depicted, all hair may not be identified as such (this may also be referred to as under-detection), and/or regions in which no hair is depicted may be associated with the hair region (this may also be referred to as over-detection).

Hair, for example hair having a natural color, may typically have a plurality of shades, not just one shade. For example, an uppermost hair layer or a hair region at the tips of the hair may have a different shade than a main part of the hair, for example because the hair is lightened by solar radiation. Alternatively or additionally, the hair at the scalp may have a different shade than the main part of the hair, for example because the hair has just grown out of the scalp and has been exposed to solar radiation for the least amount of time. These various shades may correspond to regions in the color space that are so far apart from one another that not all of them are identified as shades of hair by a conventional program, and therefore not all regions in which hair is depicted are marked as such.

To avoid such a case of under-detection, a selection area around a shade known as a hair shade may be determined, within which a pixel is associated with the hair region (a so-called selection radius may be associated with the selection area for the case of a distance from the hair shade that is the same in all directions). The selection area may be made large enough that essentially any portion of the image on which hair is depicted is determined to be hair. As a result, however, an area of the image having a shade that is within the selection area but which does not depict hair, for example an area in which skin or clothing is visible, may be associated with the hair region.

In conventional hair coloring guidance programs, a uniform shade, which may correspond to the desired hair color, for example, may be used to recolor an area of the photograph that is determined to be a hair region. As a result, however, the photograph may look unnatural with the recolored hair region, for example due to the new hair color having only one shade. Dyeing the hair may thus be perceived as undesirable.

If a photograph with a recolored hair region had a natural appearance, willingness to dye the hair could thus be increased.

BRIEF SUMMARY OF THE INVENTION

In various embodiments, a computer-assisted method is provided which avoids under-detection as well as over-detection, in other words, a computer-assisted method that associates all hair, for example the hair on the head, and only this hair, in a digital image, with the hair region.

A computer-assisted method for computer-assisted hair coloring guidance may color hair on an image, for example a digital photograph, of a user with a new desired color.

Furthermore, in various exemplary embodiments a method for computer-assisted hair coloring guidance is provided which may determine a new desired hair color based not only on a coloring product, but, for example, based also on an illustration of a person with hair having the desired hair color.

In various exemplary embodiments, a method for computer-assisted hair coloring guidance is also provided.

DETAILED DESCRIPTION OF THE INVENTION

Figure 1:
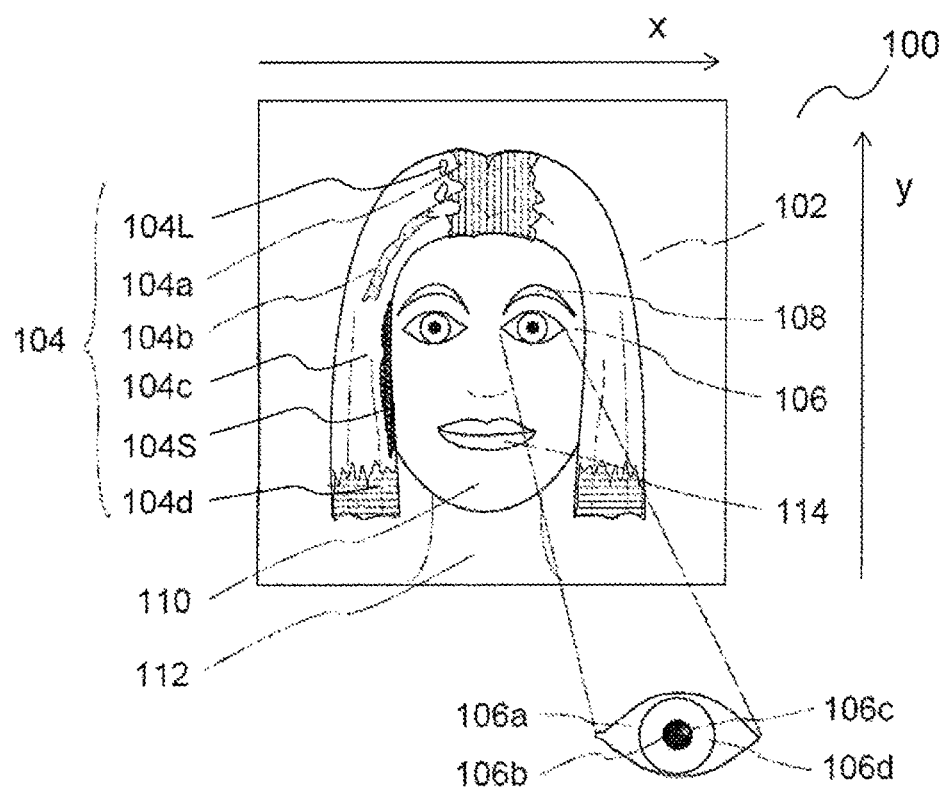
FIG. 1 shows a graphical illustration of a digital image of a person on which a plurality of hairs is visible.

The following detailed description of the invention is merely exemplary in nature and is not intended to limit the invention or the application and uses of the invention. Furthermore, there is no intention to be bound by any theory presented in the preceding background of the invention or the following detailed description of the invention.

A digital image may be understood herein to mean a data packet that is displayable by a data processing system as a two-dimensional (planar) array of pixels, for example in a coordinate system having an x axis and a y axis, at least one color information item which is displayable, for example, as a color of a pixel of a monitor or a printed dot of a printed image, being associated with each pixel. The digital image may be, for example, a photograph taken with a digital camera, a single image of a video sequence taken with a digital camera (wherein the method according to various embodiments may then be applied, for example, to a plurality of single images of the video sequence), a scanned image, a digital image that is obtained by format conversion from a digital image, or any other given data packet that is displayable by a data processing system as a two-dimensional color image.

The data processing system may include, for example, a computer, for example with an attached screen, such as a laptop or a tablet. The data processing system may also include, for example, a smart phone or any other given data processing system that is able to convert the data packet into the associated two-dimensional array of colored pixels and optionally display them as an image.

The terms "hair region" and "hair region surface" are used synonymously herein. The hair region may contain a plurality of pixels of a digital image which depict hair and which are able to form a surface that is cohesive or composed of a plurality of individual surfaces. A plane in which the hair region may be situated may be defined, for example, by the x axis and the y axis of the digital image.

A "color" may be understood herein to mean an interaction of a shade (i.e., a spectral color impression, also referred to as the hue, which is regarded as the "actual color"), a color intensity (i.e., how intense the color appears compared to a neutral gray, for example, also referred to as saturation, color saturation, color intensity, chromaticity, or color depth), and lightness (i.e., how light or dark the color appears).

In various exemplary embodiments, statistics of common hair colors may be utilized in the method in order to determine a selection area in the color space, in which pixels of a digital image may be associated with a hair region, in such a way that all or essentially all hair, for example primary hair (i.e., hair on the head, excluding eyebrows, eyelashes, beard, etc.), in a digital image is associated with the hair region, but no or essentially no areas that depict no hair, for example no hair on the head, are associated with the hair region.

In various exemplary embodiments, the statistics of common hair colors may be determined by determining in each case a typical frequency distribution for at least one color information item for a plurality of hair colors that commonly occur in humans. The color information item may, for example, be a color information item that is parameterized in a color space. For example, the color information item may be characterized using a plurality of parameters in such a way that a color may be unequivocally determined using the plurality of parameters.

In various exemplary embodiments, the color information item may, for example, have a parameterization in a known color space, for example in an L*a*b* color space (where L* indicates the lightness of a color, a* indicates the green and red components of the color, and b* indicates the blue and yellow components of the color), in an RGB color space via color components in red, green and blue, in a CMYK color space via color components in cyan, magenta, yellow, and black, or in any other given color space.

The term "shade" may, as described above, be understood herein to mean the spectral color impression of a color, regardless of how it may be parameterized, for example as a point in a two-dimensional color space (for example, a*b* of the L*a*b* system), or a ratio of color components (such as in the RGB color space or the CMYK color space).

Hair color statistics, for example the statistics of common hair colors or statistics of hair colors that are achievable by dyeing, in various exemplary embodiments may in each case have a frequency distribution of at least one hair color information item for a plurality of hair colors, for example for a plurality of common hair colors or for a plurality of hair colors that are achievable by dyeing. For example, the most commonly occurring value of the hair color information item may be retrievable from the frequency distribution of the at least one hair color information item. In addition, for example one or more values of the hair color information item which occur(s) less often than the value of the most commonly occurring hair color information item may be retrievable.

As described above, a hair color, for example a common hair color or a hair color that is achievable by dyeing, may have a plurality of shades, not just one shade. One shade may be seen more often in the hair, for example on an image depicting the hair, than some other shade or multiple other shades. In other words, a hair color may have a (non-uniform) hair shade frequency distribution instead of a single shade. The most common shade may also be referred to as the primary hair shade.

In addition, in various exemplary embodiments, at least one shade that is seen less often in the hair than the at least one primary hair shade may be referred to as the secondary hair shade.

In various exemplary embodiments, the frequency distribution of the at least one color information item may include the hair shade frequency distribution.

Furthermore, in various exemplary embodiments the frequency distribution of the at least one color information item, analogously to the shade frequency distribution having a primary shade and secondary shades, may have a frequency distribution of a lightness with a primary lightness and at least one secondary lightness, and/or a frequency distribution of the saturation with a primary saturation and at least one secondary saturation.

In various exemplary embodiments, in each case a totality of the plurality of color information frequency distributions may be referred to as hair color statistics. In a case in which a plurality of common hair colors is used as the basis for determining the color information frequency distributions, the hair color statistics may be hair color statistics of common hair colors. In a case in which a plurality of hair colors that are achievable by dyeing is used as the basis for determining the color information frequency distributions, the hair color statistics may be hair color statistics of hair colors that are achievable by dyeing.

In various exemplary embodiments, the hair color statistics of common hair colors may be generated, for example, by creating in each case at least one digital image of a plurality of persons, hair of the particular depicted person being visible on each of the digital images, and each of the persons having a common hair color, wherein a totality of the common hair colors may include, for example, more than 70%, for example more than 80%, for example more than 90%, for example more than 95%, of the hair colors occurring in humans. In various exemplary embodiments, the common hair colors may relate to the hair colors that are common in the regional area where the method is planned to be used. Based on the plurality of digital images, which in each case depict a hair color of the common hair colors, a hair color information frequency distribution may be determined for each hair color of the plurality of common hair colors. In various exemplary embodiments, the hair color information may be parameterized in a color space that is independent of the medium, for example in an L*a*b* color space.

In various exemplary embodiments, a method for computer-assisted hair coloring guidance may be provided which comprises determining a hair region surface, in which hair is depicted, in a digital image of a person on which hair is visible, determining an image color information frequency distribution that corresponds to a frequency distribution of at least one color information item for a plurality of pixels in the digital image, and comparing the image color information frequency distribution to hair color statistics, the hair color statistics for a plurality of hair colors in each case including at least one frequency distribution of at least one hair color information item, wherein the hair color statistics may be statistics of common hair colors, the plurality of hair colors may be a plurality of hair colors that commonly occur in humans, and a totality of the common hair colors may include more than 70% of the hair colors that occur in humans. The totality of common hair colors may include, for example, more than 80%, for example more than 90%, for example more than 95%.

In various exemplary embodiments, an image color information frequency distribution may be determined for a digital image. The image color information frequency distribution may in each case associate a number of pixels in the digital image of the person or a partial area of the image of the person, having the image color information value, with an image color information value. In other words, a frequency with which this image color information value occurs in the image or the partial area of the image may be associated with each image color information value.

For example, the image color information may include a shade, for example an image shade. The image color information frequency distribution may then associate a frequency with which this shade occurs in the image or the partial area of the image, in other words, the number of pixels having the particular shade, with each shade of a plurality of shades.

In various exemplary embodiments, the image color information frequency distribution may be compared to the hair color statistics, for example to the plurality of frequency distributions of the at least one hair color information item for the plurality of hair colors, for example for the plurality of common hair colors or for the plurality hair colors that are achievable by dyeing. The image color information may relate to the same type of information as the hair color information. For example, the color information (the image color information and the hair color information) may relate to a shade. In other words, the image information frequency distribution may have a distribution of frequencies with which various shades occur in the image, i.e., how many of the plurality of pixels in the digital image have which shade in each case. For each hair color of a plurality of hair colors, the hair color information frequency distribution may have a distribution of frequencies with which various shades occur for a hair color (for example, for the common hair color or the hair color that is achievable by dyeing).

In various exemplary embodiments, the most similar hair color information frequency distribution may be determined by comparing the image color information frequency distribution to the hair color statistics.

For this purpose, for example for each hair color information frequency distribution of the plurality of hair color information frequency distributions, a measure of a difference between the hair color information frequency distribution and the image color information frequency distribution may be determined, for example as the sum of absolute values of the differences between the hair color information frequency and the image color information frequency over the plurality of color information values, or as the sum of the squares of the differences between the hair color information frequency and the image color information frequency over the plurality of color information values. Alternatively, any other measure that allows a determination of the most similar hair color information frequency distribution from the plurality of hair color information frequency distributions may be used.

In various exemplary embodiments, the most similar hair color information frequency distribution may be the hair color information frequency distribution from the plurality of hair color information frequency distributions for which the measure of the difference is the smallest.

In various exemplary embodiments, each of the color information frequency distributions may be normalized, for example to a value of 100, for the highest frequency value in each of the color information frequency distributions. The situation may thus be avoided that a hair color information frequency distribution is determined as the most similar hair color information frequency distribution solely because its absolute frequency values are similar to those of the image information frequency distribution.

In various exemplary embodiments, a method for computer-assisted hair coloring guidance may be provided which comprises determining a hair region surface, in which hair is depicted, in a digital image of a person on which hair is visible, determining an image color information frequency distribution that corresponds to a frequency distribution of at least one color information item for a plurality of pixels in the digital image, comparing the image color information frequency distribution to hair color statistics, the hair color statistics for a plurality of hair colors in each case including at least one frequency distribution of at least one hair color information item, and determining the most similar hair color information frequency distribution from the hair color statistics, wherein the most similar hair color information frequency distribution may be the frequency distribution from the plurality of hair color information frequency distributions that is most similar to the image color information frequency distribution, in that a measure of a difference between the hair color information frequency distribution and the image color information frequency distribution is smallest for the most similar hair color information frequency distribution. The measure of the difference between the hair color information frequency distribution and the image color information frequency distribution may, for example, be a sum of absolute values of differences between the hair color information frequency and the image color information frequency over the plurality of color information values, or a sum of the squares of the differences between the hair color information frequency and the image color information frequency over the plurality of color information values, or any other measure that allows determination of the most similar hair color information frequency distribution from the plurality of hair color information frequency distributions.

In various exemplary embodiments, for determining the hair region, i.e., a hair region surface, i.e., a surface in the digital image in which hair is depicted, the most similar hair color information frequency distribution may be used to limit an area in a space that is parameterized, at least among other things, by the color information item. This area may also be referred to as the selection area. In other words, the selection area may be determined in such a way that one pixel from the plurality of pixels of the digital image may then be exactly associated with the hair region when its color information value also occurs in the most similar hair color information frequency distribution, in other words, when the at least one color information item or the at least one color information value of a pixel corresponds to at least one color information item or to at least one color information value in the most similar hair color information frequency distribution, for example when a shade of a pixel corresponds to, for example is the same as, a shade that occurs in the most similar hair color information frequency distribution.

Over-detection may thus be avoided or reduced, since only pixels for which the color information, for example the shade, corresponds to a color information item that is typical for a hair color can be associated with the hair region. In other words, with regard to the color information item (for example, a selection area in the color space), the selection area is not arbitrarily enlarged in all directions, for example, in order to encompass preferably all hair, but, rather, is enlarged essentially only in the directions in which hair may also be found.

On the other hand, however, under-detection may also be avoided or reduced, since pixels which do depict the hair but whose color information item differs greatly from a most common color information item may also be detected as belonging to the hair region when their color information, for example their shade, has a color information item that is typical for the hair color (and therefore occurs in the most similar hair color information frequency distribution).

In various exemplary embodiments, the hair region, i.e., the hair region surface, i.e., the pixels present within the hair region surface, may be recolored with a desired hair color. The recoloring may be carried out in such a way that the desired hair color is not displayed with uniform hair color information, for example a uniform shade, but, rather, a distribution with regard to the hair color information is depicted which corresponds to the hair color information frequency distribution for this hair color, for example from the plurality of hair colors that are achievable by dyeing. In this way, a more natural impression may be given for an expected color result.

In various exemplary embodiments, a color space that originates from the color information (hair color information and image color information) may be such that a determined or displayed color is independent from a medium that determines or displays the color (for example, a screen, printer, scanner, human eye, etc.). The color space may be an L*a*b* color space, for example, and the color information item may be a shade that is parameterized by means of a* and b*, for example. The uniform display in the medium-independent color space allows presentation of a realistic expected color result.

For this purpose, in various exemplary embodiments, hair of models may be dyed with a plurality of hair dyes. The dyed hair of each model may be photographed and stored as a digital image, whereby the color information item may be stored in the medium-independent color space, for example the L*a*b* color space, or converted into same. Each of the hair colors achieved by dyeing may correspond to one of the hair colors that are achievable by dyeing. For each of the hair colors that are achievable by dyeing, based on the digital image a frequency distribution of the hair color information, for example a frequency distribution of the shades in the L*a*b* color space, may be determined; i.e., for each color information value, for example each shade, for example each shade of the L*a*b* color space, it may be determined how many pixels in the digital image in which the dyed hair of the model, among other things, is depicted contain the particular color information value, for example the particular shade, for example the particular shade of the L*a*b* color space.

In various exemplary embodiments, the plurality of frequency distributions of the hair color information may form the hair color statistics, for example the hair color statistics for the hair colors that are achievable by dyeing.

In various exemplary embodiments, the color information, for example the shade, may also be parameterized in an output or display medium in the medium-independent color space, for example the L*a*b* color space. It is thus possible that, for example the expected color result as described above, which may be displayed on a screen or printed, for example, appears as essentially or completely the same color or color distribution as the dyed hair of the model if it were directly observed, or for the digital image of the model, if it were displayed on a screen or printed, for example on a package of the dye. The situation may thus be avoided that a color distortion occurs due solely to different display or recording media, which could lead to a color result appearing to the user to have a different color than would be expected, for example based on the dye package or a presentation of computer-assisted hair coloring guidance.

In various exemplary embodiments, for example when the most similar hair color information frequency distribution is determined from the statistics of the hair colors that are achievable by dyeing, the most similar hair color information frequency distribution may be used to determine, for the hair that is depicted on the digital image, or for the color of the hair, a dye that allows a color result that is most similar to the depicted hair color.

Skin, for example facial skin of the person having the hair, may also be visible in essentially every image on which hair can be seen. For determining the hair region, it may be advantageous to have statistics of common skin colors (also referred to as skin color statistics) available. The statistics of common skin colors may in each case include at least one frequency distribution of at least one skin color information item for a plurality of skin colors that commonly occur in humans.

In various exemplary embodiments, the skin color statistics may be generated essentially analogously to the hair color statistics, for example the hair color statistics of common hair colors, by generating in each case at least one digital image from a plurality of persons, whereby skin, for example facial skin, of the particular depicted person is visible on each of the digital images, and each of the persons has a common skin color, whereby a totality of the common skin colors may include, for example, more than 70%, for example more than 80%, for example more than 90%, for example more than 95%, of the skin colors that occur in humans. In various exemplary embodiments, the common skin colors may relate to the skin colors that are common in the regional area where the method is planned to be used. A skin color information frequency distribution may be determined for each skin color of the plurality of common skin colors based on the plurality of digital images, which in each case depict one skin color of the common skin colors. In various exemplary embodiments, the skin color information may be parameterized in a medium-independent color space, for example in the L*a*b* color space.

By comparing to the image color information frequency distribution, the most similar skin color information frequency distribution may be determined based on the skin color statistics, whereby the most similar skin color information frequency distribution may be the frequency distribution from the plurality of skin color information frequency distributions that is most similar to the image color information frequency distribution. The skin color information frequency distributions may be normalized in various exemplary embodiments, as described above for the hair color information frequency distributions.

In various exemplary embodiments, the most similar skin color information frequency distribution may be used to determine a skin area surface, which may also be referred to as a skin area. Analogously to the above description for determining the hair region, the pixels of the digital image, which contain image color information that corresponds to, for example is the same as, a skin color information item in the most similar skin color information frequency distribution, may be associated with the skin area. In various exemplary embodiments, the skin area and the hair region may be separate areas. In other words, a pixel cannot simultaneously be associated with the hair region and with the skin area.

In various exemplary embodiments, prior to determining the image color information frequency distribution and/or prior to determining the hair color information frequency distribution (generally referred to as the color information frequency distribution), the user may determine a partial area that is to be used for determining the color information frequency distribution. This may be utilized to decrease a frequency of pixels, which do not represent hair, in the region of the image area for determining the color information frequency distribution.

The partial area may be marked by the user, for example on a display of the digital image, for example on a monitor, for example by encircling it (in the case that the encircled region is the partial area) or by tapping a point, whereby the partial area may be determined, for example, by a radius around the tapped point.

In various exemplary embodiments, determining the partial area and identifying and displaying the hair region may be carried out iteratively. In other words, the user may determine a partial area, and the hair region may be determined and recolored as described above, for example. In a case in which the result is not satisfactory, it is possible, for example in the case of under-detection, for the user to determine an additional partial area, and the hair region may be determined and recolored based on the two determined partial areas and recolored. In the case of over-detection, the user may determine that a subsequent marking is to carry out a deselection, in other words, that the subsequent marking designates a partial area, also referred to as a deselection area that does not depict hair. In this case, in the subsequent determination of the hair region, it is possible to use only the first determined partial area for determining the hair region for identifying pixels as belonging to the hair region. In the deselection area, a color information frequency distribution may be determined which may be used, based on the most similar color information frequency distribution determined as described above, for removing such color information items, for example shades, that do not represent hair.

In various exemplary embodiments, prior to determining the image color information frequency distribution, the digital image may be checked as to whether a correction of the image would be advantageous, and the digital image may be corrected if the check indicates that the correction would be advantageous.

In various exemplary embodiments, a preliminary image color information frequency distribution may be created. This may be created essentially in the same way as for the image color information frequency distribution. The preliminary image color information frequency distribution may typically be created on the entire image.

Essentially conventional methods for image optimization may be used for determining the need for correction and optionally making the correction. For example, the preliminary image color information frequency distribution may include lightness and color information items. The lightest surface areas, i.e., the lightest, for example cohesive, pixels, may be determined on this basis. The lightest surface areas, for example in an image that represents the head of a person, are typically white or practically white, for example the white of the eye, reflections on the pupil, etc. The lightest surface area(s) may be assessed as white or practically white when each of their color or lightness values in the particular color space in which they are parameterized deviates from the white value of the parameter (i.e., the value assumed by the particular parameter for pure white) by a maximum of 10%, for example by a maximum of 5%, for example by a maximum of 2%, of the particular maximum value of the parameter. For a parameterization by way of example in the L*a*b* color space and a maximum tolerated deviation from white (L*=100, a*=0, b*=0) of 10%, for example L* would have to be in the range of 90 to 100, a* in the range of −15 to +10, and b* in the range of −10 to +15.

A significant deviation from white (i.e., an exceedance of the maximum tolerated deviation from white for at least one of the parameters) for the lightest surface areas in the image may be an indication of a color cast or a gray haze in the image; for example, a shade of each pixel may be superimposed on an additional shade that is, for example, the same for all pixels. This color cast may be corrected, for example, by computationally removing the additional shade in all pixels. The correction may be made in such a way that, for example, for the lightest surface areas in the image, all parameters of the color or color lightness parameterization of the pixels correspond exactly to the white value (for example L*=100, a*=0, b*=0 for a parameterization in the L*a*b* color space), or in such a way that the parameters lie within the range that is assessed as practically white, as described above.

In various exemplary embodiments, the preliminary image color information frequency distribution may be analyzed with regard to a lightness distribution. Images which allow good color and structure recognition may typically have a broad lightness distribution. In a case in which the preliminary image color information frequency distribution has only a narrow lightness range, the lightness range may be computationally enlarged.

In addition, in various exemplary embodiments a color saturation may be computationally changed, for example in a case in which the image has an appearance, visually or based on statistical tests of the preliminary image color information frequency distribution, with too much color intensity or too little color intensity.

In various exemplary embodiments, in which a correction of the digital image is made, the corrected image may be used as the basis for the further method, for example for determining the image color information frequency distribution.

In various exemplary embodiments, a shadowed hair region may be determined in the digital image. The shadowed hair region, which may also be referred to as the shadowed hair region surface, may have a surface area in the hair region in which the hair is in shadow. In other words, the shadowed hair region surface may have a surface that is cohesive or composed of a plurality of individual surfaces in which the hair appears darker than some other portion of the hair due to shadowing.

In various exemplary embodiments, the shadowed hair region surface may be determined by identifying a plurality of pixels with very low brightness, based on a brightness information item in the image color information frequency distribution, i.e., a brightness distribution for the pixels associated with the hair region, and determining these pixels to be part of the shadowed hair region surface. For example, 20% or fewer of the pixels having the lowest brightness, for example 10% of the pixels having the lowest brightness, for example 5% of the pixels having the lowest brightness, for example at least one pixel having the lowest brightness, in the brightness distribution of the pixels may be identified as pixels with very low brightness.

In various exemplary embodiments, a brightened hair region may be determined in the digital image. The brightened hair region, which may also be referred to as the brightened hair region surface, may have a surface area in the hair region in which the hair appears to be more intensely illuminated by a light source than in other hair regions. In other words, the brightened hair region surface may have a surface, which is cohesive or composed of a plurality of individual surfaces, in which the hair appears to be brighter than some other portion of the hair due to illumination.

In various exemplary embodiments, the brightened hair region surface may be determined by identifying a plurality of pixels having very high brightness, based on a brightness information item in the image color information frequency distribution, i.e., a brightness distribution for the pixels associated with the hair region, and determining these pixels to be part of the brightened hair region surface. For example, 20% or fewer of the pixels having the highest brightness, for example 10% of the pixels having the highest brightness, for example 5% of the pixels having the highest brightness, for example at least one pixel having the highest brightness, in the brightness distribution of the pixels may be identified as pixels having very high brightness.

In various exemplary embodiments, the shadowed hair region surface and the brightened hair region surface may be used to create a shadow-light mask. An average brightness may be determined for the hair region surface, based on the brightness distribution, whereby the average brightness in the hair region surface may correspond to a statistical average value, for example an arithmetic mean or a median, of the brightness of the plurality of pixels in the hair region surface.

In various exemplary embodiments, a brightness difference value between the brightness of the at least one pixel and the average brightness in the hair region surface may be determined in each case for the at least one pixel, for example the plurality of pixels in the shadowed hair region surface, and the at least one pixel, for example the plurality of pixels, in the brightened hair region surface.

In various exemplary embodiments, the brightness difference values may be arranged in two dimensions in such a way that a shadow-light mask results in which the brightness difference values that are associated in each case with the at least one pixel of the brightened hair region surface or the at least one pixel of the shadowed hair region surface are situated at the spatial positions that correspond to the at least one pixel of the brightened hair region surface or to the at least one pixel of the shadowed hair region surface, respectively. In other words, the shadow-light mask may be put together from the plurality of brightness difference values.

In various exemplary embodiments, after the hair region has been recolored, the shadow-light mask may be superimposed on the recolored hair region. In other words, the recolored hair region may be subsequently provided with brightened and shadowed areas by means of the shadow-light mask, so that an original impression of illumination of the hair is restored. The natural impression of the recolored hair may be further improved in this way.

In various exemplary embodiments, a structural information item may be used in addition to the color information item in determining the hair region surface.

For example, the image color information frequency distribution may be analyzed using a spatial arrangement of the pixels whose image color information items are detected in the image color information frequency distribution. Essentially known methods for linking color information and structure information may be used for this purpose. For example, an area that contains a color information item which is similar to a color information item of a pixel associated with the hair region, and which is surrounded or partially surrounded, for example, by pixels that are associated with the hair region and spatially adjacent to same, may be recognized as belonging to the hair region and may be associated with same. In another example, an area that contains a color information item which is similar to a color information item of a pixel associated with the hair region, and which is spatially adjacent to the pixels that are associated with the hair region, for example in two approximately opposite directions, may be recognized as part of a linear structure of the hair region, for example a hair strand, and may be associated with the hair region.

In various exemplary embodiments, position information may be used, in addition to the color information and optionally the structural information, in determining the hair region surface.

For example, the above-described analysis of the image color information frequency distribution may be employed, using the spatial arrangement of the pixels, for identifying pixels that contain a color information item which is similar or identical to a color information item of a pixel that is associated with the hair region, but which has no spatial connection to the hair region, for example the hair region having the partial area marked by the user. The pixels identified in this way may be determined as not belonging to the hair region. Accordingly, these pixels may be disregarded in further processing of the pixels that are associated with the hair region.

In various exemplary embodiments, a method for computer-assisted hair coloring guidance may comprise determining a hair region surface, in which hair is depicted, in a digital image of a person on which a plurality of hairs is visible. The determining of the hair region surface may include determining an image color information frequency distribution, which may correspond to a frequency distribution of at least one color information item for a plurality of pixels in the digital image, as well as comparing the image color information frequency distribution to hair color statistics, whereby the hair color statistics for a plurality of hair colors may in each case include at least one frequency distribution of at least one hair color information item.

In one embodiment, the hair color statistics may be statistics of common hair colors, and the plurality of hair colors may be a plurality of hair colors commonly occurring in humans.

In one embodiment, the hair color statistics may be statistics of hair colors that are achievable by dyeing, and the plurality of hair colors may be a plurality of hair colors that are achievable by dyeing.

In one embodiment, the method may further comprise determining the most similar hair color information frequency distribution from the hair color statistics, whereby the most similar hair color information frequency distribution is the frequency distribution from the plurality of hair color information frequency distributions that is most similar to the image color information frequency distribution.

In one embodiment, the method may further comprise associating with the hair region surface a plurality of pixels in the image, whose at least one color information item corresponds in each case to at least one color information item in the most similar hair color information frequency distribution.

In one embodiment, the method may further comprise comparing the image color information frequency distribution to skin color statistics, whereby the skin color statistics for a plurality of skin colors commonly occurring in humans may in each case include at least one frequency distribution of at least one skin color information item, and determining the most similar skin color information frequency distribution from the skin color statistics, whereby the most similar skin color information frequency distribution may be the frequency distribution from the plurality of skin color information frequency distributions that is most similar to the image color information frequency distribution.

In one embodiment, the method may further comprise associating at least one pixel in the digital image, whose at least one color information item of at least one color information item in the skin color information items may correspond to the most similar skin color information frequency distribution, with a skin area surface, whereby the skin area surface may be different from the hair region surface.

In one embodiment, the method may further comprise determining a shadowed hair region surface, whereby at least one pixel, which may be associated with the hair region surface and whose lightness may be close to or at a minimum lightness of the plurality of pixels in the hair region surface, may be associated with the shadowed hair region surface.

In one embodiment, the method may further comprise determining a brightened hair region surface, whereby at least one pixel, which is associated with the hair region surface and whose brightness is close to or at a maximum brightness of the plurality of pixels in the hair region surface, may be associated with the brightened hair region surface.

In one embodiment, the method may further comprise creating a shadow-light mask. Creating the shadow-light mask may comprise determining an average brightness in the hair region surface, whereby the average brightness in the hair region surface may correspond to a statistical average value of the brightnesses of the plurality of pixels in the hair region surface, and for the at least one pixel in the shadowed hair region surface and in the brightened hair region surface in each case, determining a brightness difference value between the brightness of the at least one pixel and the average brightness in the hair region surface, and combining the brightness difference values to obtain the shadow-light mask.

In one embodiment, the method may further comprise specifying a partial area within the digital image by a user.

In one embodiment, the specifying of the partial area by the user may comprise marking the partial area on the image of the person displayed on a screen.

In one embodiment, the frequency distribution in the partial area may be ascertained for determining the image color information frequency distribution.

In one embodiment, the determining of the hair region surface may further comprise incorporating a spatial structure that is recognized in the image of the person.

In one embodiment, the method may further comprise, prior to determining the hair region surface, generating statistics of color information items and/or lightness information items of the plurality of pixels in the overall image, and determining the need for an image correction, and making an image correction when the determination of the need for an image correction indicates that an image correction should be made.

In one embodiment, the image correction may include a lightness correction and/or a color correction.

In one embodiment, the method may further comprise selecting, by the user, an achievable hair color from the plurality of hair colors that are achievable by dyeing, and recoloring the plurality of pixels in the hair region surface corresponding to a plurality of new color information items, whereby a new color information item may be associated with each pixel of the plurality of pixels in the hair region surface, and the plurality of new color information items may be selected in such a way that their frequency distribution may correspond to the hair color information frequency distribution for the selected achievable hair color.

In one embodiment, the method may further comprise superimposing the recolored hair region surface on the shadow-light mask, whereby the superimposing of the hair region surface on the shadow-light mask may correspond to brightening of at least one pixel within the brightened hair region surface by the brightness difference value that is associated with this pixel, and darkening of at least one pixel within the shadowed hair region surface by the brightness difference value that is associated with this pixel.

In one embodiment, the color information may be information concerning a shade.

In one embodiment, the shade may be parameterized in a media-independent color space.

In one embodiment, the media-independent color space may be an L*a*b* color space.

In one embodiment, the method may further comprise presenting at least one dye which may be associated with the most similar hair color information frequency distribution.

In one embodiment, the dye may be a coloring product from a product line.

In one embodiment, the dye may be a coloring product from a Schwarzkopf product line, for example.

In various exemplary embodiments, a data processing device for carrying out computer-assisted hair coloring guidance may be provided. The data processing device may include a processor, whereby the processor may be configured for determining a hair region surface, in which hair is depicted, in a digital image of a person on which hair is visible, whereby the determining of the hair region surface may include determining an image color information frequency distribution, which may correspond to a frequency distribution of at least one color information item for a plurality of pixels in the digital image. The processor may also be configured for comparing the image color information frequency distribution to hair color statistics, whereby the hair color statistics for a plurality of hair colors may in each case include at least one frequency distribution of at least one hair color information item.

Exemplary embodiments of the invention are illustrated in the figures and explained in greater detail below.

In the following detailed description, reference is made to the appended drawings, which constitute a part of the present patent invention and which show specific embodiments for purposes of illustration, and via which the invention may be carried out. In this regard, direction terminology such as "top," "bottom," "at the front," "at the rear," "front," "rear," etc. is used with reference to the orientation of the described figure(s). Since components of embodiments may be positioned in a number of different orientations, the direction terminology is used for illustration, and is in no way limiting. It is understood that other embodiments may be used, and structural or logical changes made, without departing from the scope of protection of the present invention. It is understood that the features of the various exemplary embodiments described herein may be combined with one another unless specifically stated otherwise. The following detailed description is therefore not to be construed in a limiting sense, and the scope of protection of the present invention is defined by the appended claims.

FIG. 1 shows a graphical illustration 100 of a digital image of a person on which a plurality of hairs 104 is visible. A totality of the plurality of hairs may also be referred to herein as "the hair." The hair 104 may be situated in a surface area of the digital image 100, which may be referred to as the hair region 104 or hair region surface 104. Since the depicted hair 104 and the surface area 104 in which the illustrated hair is situated are congruent, the same reference numeral 104 is used for both.

The digital image 100 may be of a type described above, for example a photograph from a digital camera or the like.

The digital image 100 may include a plurality of pixels (not illustrated with resolution), which may be situated, for example, as a two-dimensional surface of pixels, for example along coordinates x and y. At least one color information item, which is illustrated as the value of the pixel in the digital image 100, for example as the color of the pixel, may be associated with each pixel. This is intended to be indicated in part by hatching, etc., in FIG. 1, but gives only an incomplete sense of the value of the pixel, since, strictly speaking, each pixel of a hatching has only one of two values (black or white). Nevertheless, for example hatched areas such as the areas 104d, 104a, etc. are to be understood as surface areas of pixels which contain a color and/or lightness information item that is different from unhatched or differently hatched areas.

In various exemplary embodiments, the at least one color information item of each pixel may, as described above, have a parameterization of the color information item in a color space, for example in an L*a*b*, an RGB, or a CMYK color space.

The hair 104 may include the plurality of areas 104a, 104b, 104c, 104d, 104S, and 104L, which may be different from one another with regard to at least one color information item and/or with regard to at least one lightness information item. For example, area 104c may be the area in which the at least one color information item is uniform or essentially uniform for a large portion of the hair, in which, for example, one color information item only negligibly differs from another one, for example in which the color information items in a color space have areas that are adjacent to one another or only slightly spaced apart. In various exemplary embodiments, area 104c may be referred to as an area having a primary hair color, and an associated color information item may be referred to as a primary color information item HFI (see FIG. 2). Other, for example smaller, surface areas 104d, 104a, 104b of the depicted hair may have a hair color, also referred to as the secondary hair color, that is different from the primary hair color. The at least one (smaller) surface area 104d, 104a, 104b may contain at least one pixel, whereby the at least one pixel may contain at least one color information item, also referred to as a secondary color information item, that is different from the primary color information HFI.

In various exemplary embodiments, the hair region 104 may also contain in each case at least one brightened area 104L and one shadowed area 104S.

The brightened area 104L, as described above, may be a cohesive surface or a brightened surface 104L, composed of a plurality of individual surfaces, in which the hair 104 appears to be brightened by light, for example brighter than other areas of the hair 104 (for example, areas 104a, 104c, 104S, etc.).

The shadowed area 104S may, as described above, be a cohesive surface or a shadowed surface 104S composed of a plurality of individual surfaces, in which the hair 104 appears to be in a shadow, for example darker than other areas of the hair 104 (for example, areas 104a, 104c, 104S, etc.).

Depending on a parameterization of the at least one color information item of the pixels of the digital image 100, a lightness information item of the pixels may be independent of the at least one color information item (for example, in the L*a*b* color space, which may parameterize the color information in the parameters a* and b*, and the lightness information in the parameter L*), or may be dependent on the at least one color information item (for example, in the RGB color space, in which the lightness may be determined by values of the color parameters R, G, and B).

In addition to the hair region 104, the digital image 100 may have even further areas, for example an eyebrow area 108, a skin area 110, 112, which, for example, may include a facial skin area 110 and a neck skin area 112, a background area 102, and an eye area 106, which may include a white eye area 106a, an iris area 106d, a pupil area 106b, and a light reflection area 106c.

According to various exemplary embodiments, a method for computer-assisted hair coloring guidance may, as described above, be used for recognizing the plurality of areas 104a, 104b, 104c, 104d, 104S, and 104L (i.e., the pixels present in the respective areas) as belonging to the hair region 104 and associating them with the hair region 104, while recognizing the other areas, for example the skin area 110, 112, the lip area 114, the background area 102, etc. (i.e., the pixels present in the respective areas) as not belonging to the hair region 104 and not associating them with the hair region.

Figure 2:
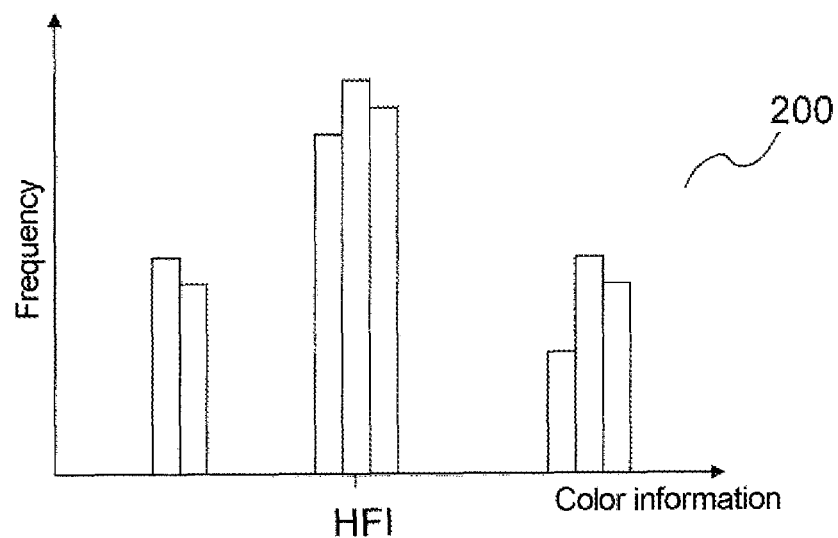
FIG. 2 shows graphical illustrations of two different hair color information frequency distributions for use in the method for computer-assisted hair coloring guidance according to various exemplary embodiments.
Figure 2:
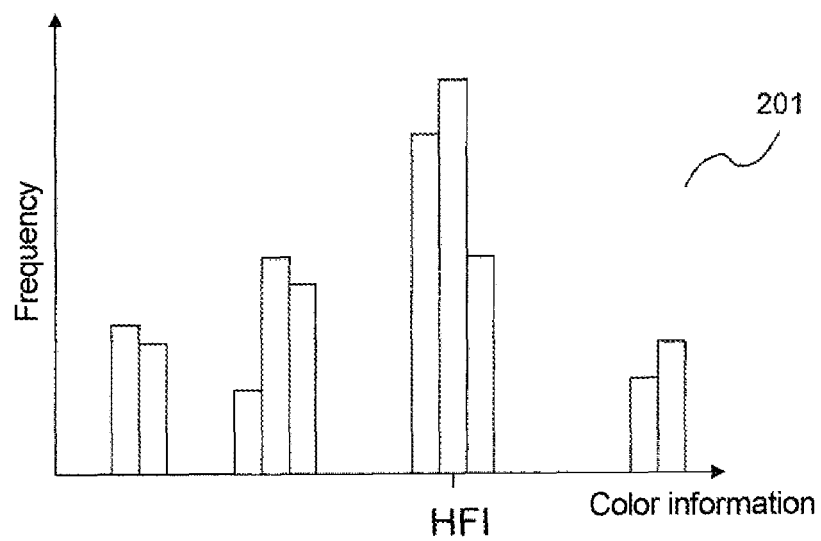

FIG. 2 shows graphical illustrations of two different hair color information frequency distributions 200 and 201 for use in the method for computer-assisted hair coloring guidance according to various exemplary embodiments. The examples shown here are used solely for illustrating the use of the hair color information frequency distributions.

As described above for various exemplary embodiments, hair color statistics, which may include a plurality of hair color information frequency distributions 200, 201, may be used for determining a hair region in a digital image, for example the hair region 104 in the digital image 100 illustrated in FIG. 1.

FIG. 2 illustrates two different examples 200 and 201 of a hair color information frequency distribution. For determining the hair color information frequency distributions 200, 201, two different digital images, on which hair having different colors may be illustrated in each case, may have been used. The digital images may include, for example, two different common hair colors for the hair color statistics of common hair colors, or two different hair colors, achievable by dyeing, for the hair color statistics of hair colors that are achievable by dyeing, as described above.

In example 200, a plurality of possible color information items (a value associated with the color information item is also referred to as a color information value) is plotted along a horizontal axis. For the digital image that has been used for determining the hair color information frequency distribution 200, a frequency with which the plurality of pixels in the digital image contains the particular color information item plotted along the horizontal axis is plotted along a vertical axis. As is apparent in the hair color information frequency distributions 200, not all color information values need to be represented in a digital image. The hair color information frequency distributions 200 may have a maximum frequency for a color information value HFI. In various exemplary embodiments, a spatial proximity of color information values on the color information axis may signify a similarity in color. This may result in the frequency distribution having a plurality of areas in which pixels contain color information items that correspond to multiple color information items situated in close proximity. For example, the area around HFI in example 200 may correspond to the area 104c from FIG. 1. Separate aggregations of color information values for the pixels that are illustrated a greater distance to the left and to the right of the area around HFI may be associated, for example, with areas 104a and 104b in FIG. 1. In various exemplary embodiments, the distance between the aggregations of color information values for the pixels may be so great that, based on the color information item, a conventional method would identify, for example, only the area around HFI as belonging to the hair region.

However, in various exemplary embodiments, the hair color information frequency distribution 200, together with at least one further hair color information frequency distribution, is used for comparing a color information frequency distribution of a digital image, in which hair is displayed, to the plurality of hair color information frequency distributions, determining the most similar hair color information frequency distribution, and then identifying and associating the pixels, which contain a color information item that also occurs in the most similar hair color information frequency distribution, as belonging to the hair region.

An additional hair color information frequency distribution 201 is illustrated in example 201. The axes, etc., correspond to those of the hair color information frequency distribution 200. The hair color information frequency distribution 201 differs from the hair color information frequency distribution 200 in that the former has been created for a different hair color, so that the pixels may contain different color information items, clusters of color information values for different color information values may be present, the most common color information item HFI may correspond to a different color information item, and the distances between clusters may be different.

The color information frequency distributions 200 and 201 may already be corrected in such a way that pixels that depict a facial area, a background area, etc. are not represented in the hair color information frequency distribution 200 and 201. The color information frequency distributions 200 and 201 may be understood as reference hair color information frequency distributions.

Figure 3:
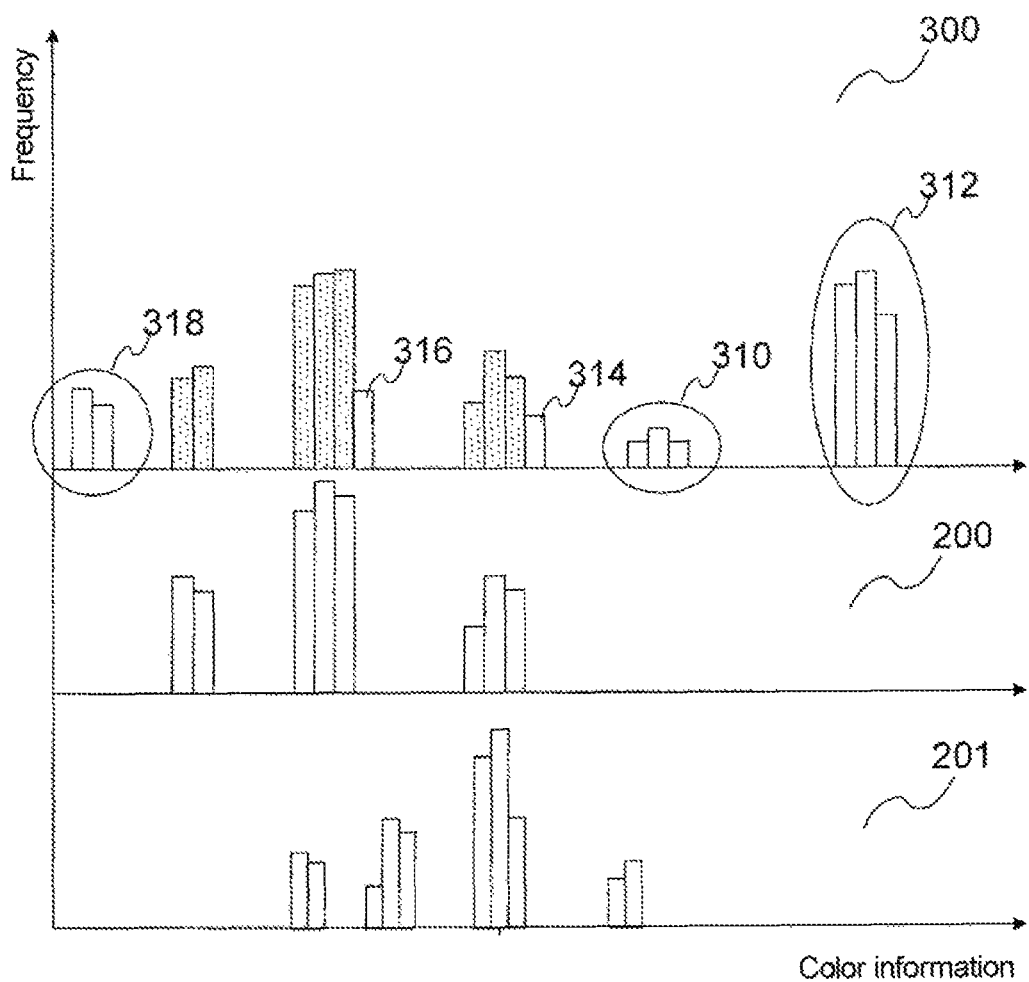
FIG. 3 shows a graphical illustration of an image color information frequency distribution together with two different hair color information frequency distributions for use in the method for computer-assisted hair coloring guidance according to various exemplary embodiments.

FIG. 3 is a graphical illustration of an image color information frequency distribution 300 together with the two different hair color information frequency distributions 200 and 201 from FIG. 2 for use in the method for computer-assisted hair coloring guidance according to various exemplary embodiments.

The axes of the image color information frequency distribution 300 may correspond to the axes of the hair color information frequency distributions 200 and 201. All pixels of a digital image, for example a digital image as illustrated in FIG. 1, may be represented in the image color information frequency distribution 300. Alternatively, only the pixels of a predetermined partial area, for example a partial area predetermined by the user as described above, may be represented in the image color information frequency distribution 300 together with its associated color information values.

The hair color information frequency distribution 200 may, as described above, have been determined as the hair color information frequency distribution 200 that is most similar to the image color information frequency distribution 300.

In associating the pixels in the digital image whose pixels are represented in the image color information frequency distribution 300, using the most similar hair color information frequency distribution 200, only those pixels are associated as belonging to the hair region which contain a color information item that corresponds, for example is equal, to at least one color information item of the most similar hair color information frequency distribution 200 (in the image color information frequency distribution 300, the corresponding color information bars are marked with dots). In various exemplary embodiments, other color information areas, for example 310, 312, and 318, or color information areas 314 and 316 situated close to the color information values associated with the hair region, may be determined as not belonging to the hair region. The color information areas 310, 312, 314, 316, and 318 may correspond, for example, to a skin area, a background area, an eye area, etc., as illustrated in FIG. 1.

Identification of the skin area, as described above, by determining a skin color information frequency distribution that is most similar to the image color information frequency distribution 300 may take place similarly as for the determination of the hair region illustrated in FIG. 3. The most similar skin color information frequency distribution (not illustrated) could, for example, contain color information values essentially only in a color information area that is characterized by reference numeral 314 in the image color information frequency distribution 300.

Figure 4:
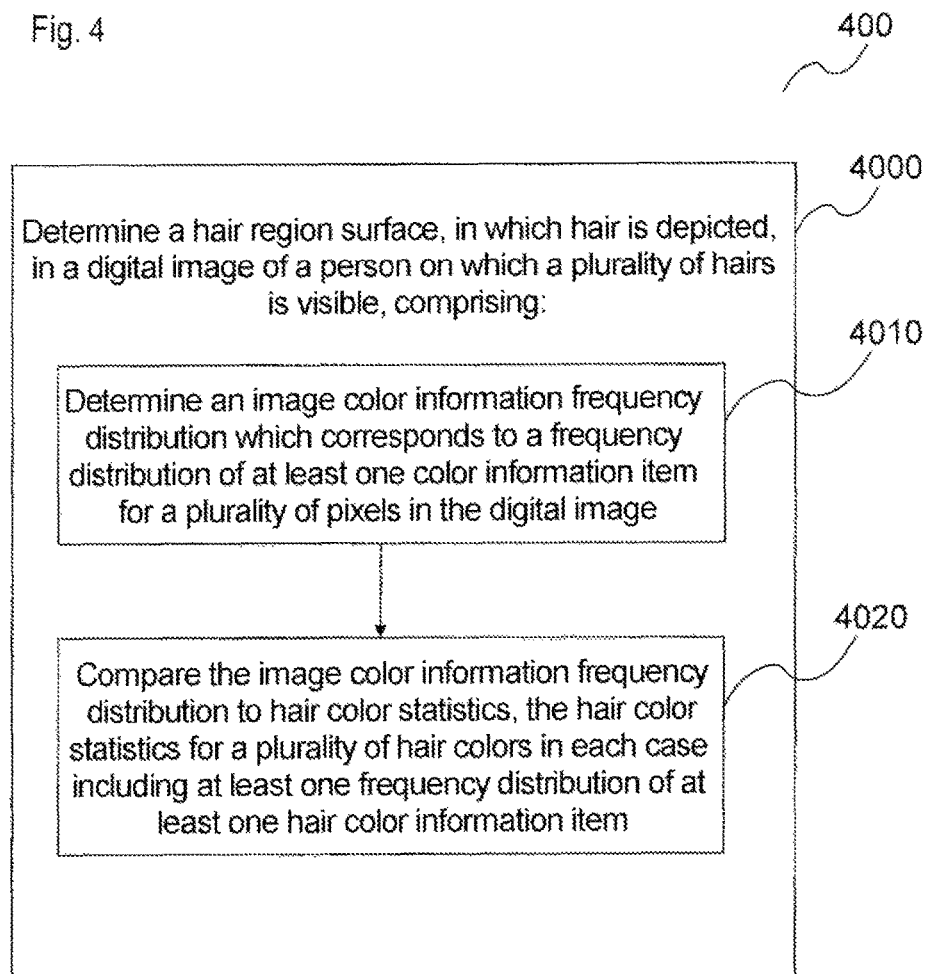
FIG. 4 shows a flow chart illustrating a method for computer-assisted hair coloring guidance according to various exemplary embodiments.

FIG. 4 shows a flow chart 400 illustrating a method for computer-assisted hair coloring guidance according to various exemplary embodiments.

In various exemplary embodiments, a method for computer-assisted hair coloring guidance may comprise determining a hair region surface, in which hair is depicted, in a digital image of a person on which a plurality of hairs is visible (in 4000). The determining of the hair region surface may include determining an image color information frequency distribution, which may correspond to a frequency distribution of at least one color information item for a plurality of pixels in the digital image (in 4010), and comparing the image color information frequency distribution to hair color statistics, whereby the hair color statistics for a plurality of hair colors may in each case include at least one frequency distribution of at least one hair color information item (in 4020).

In various exemplary embodiments, the method may include further processes and/or features described above and also below.

Figure 5A:
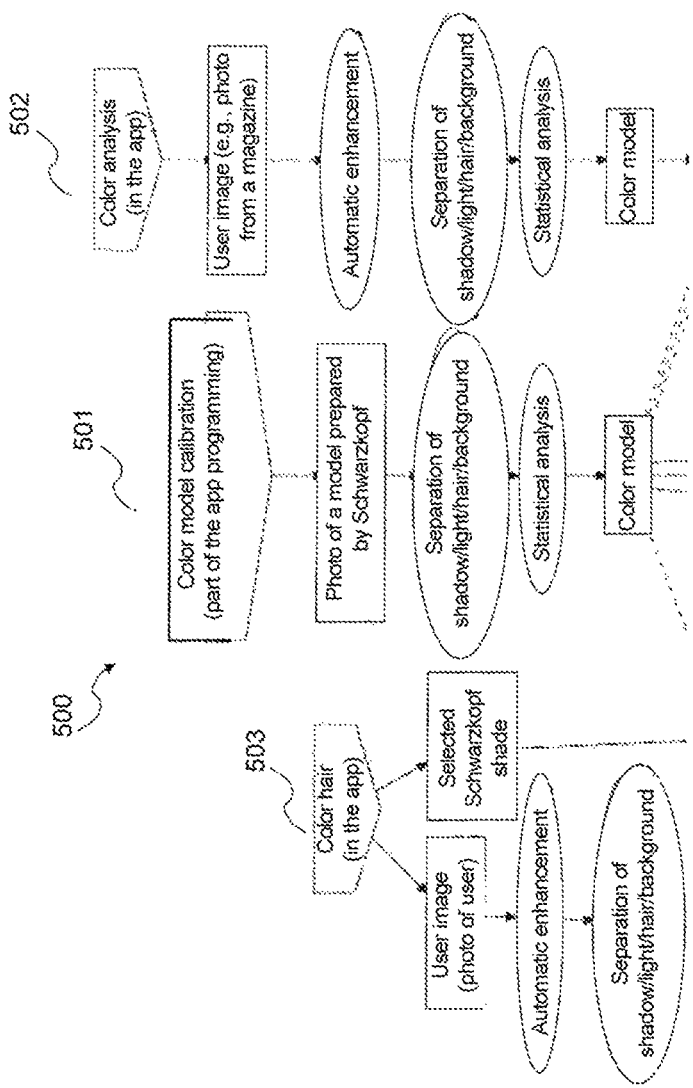
FIG. 5 shows a flow chart illustrating a method for computer-assisted hair coloring guidance according to various exemplary embodiments.
Figure 5B:
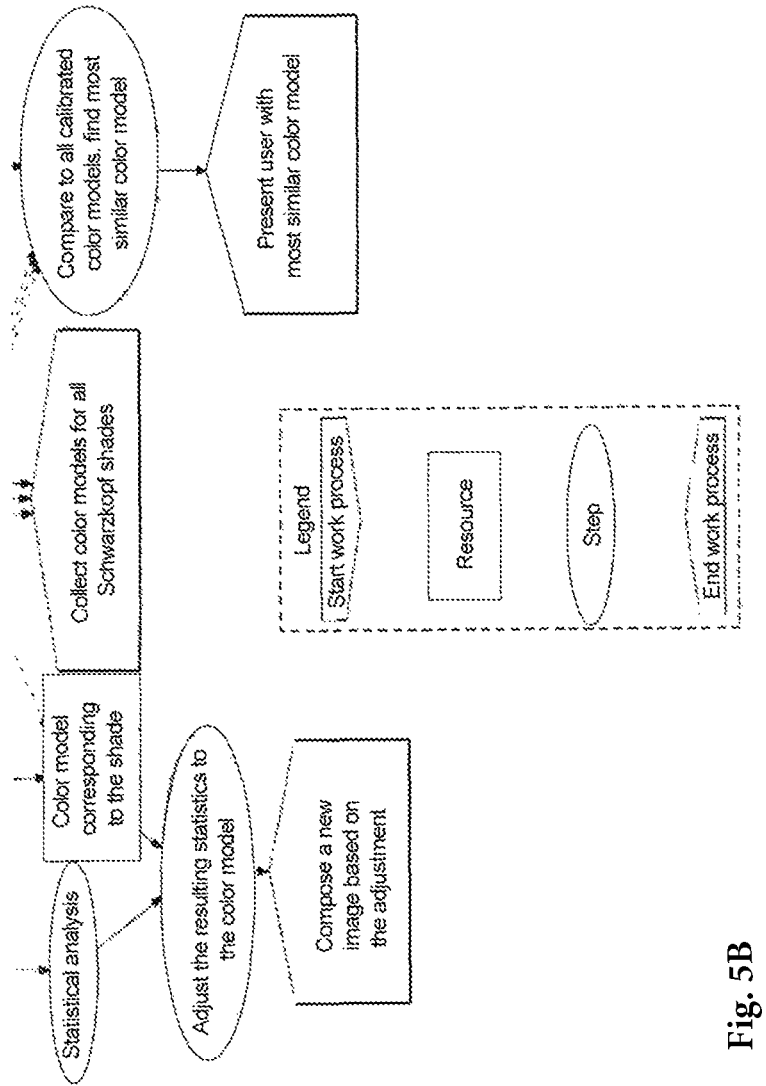

FIG. 5 shows a flow chart 500 illustrating a method for computer-assisted hair coloring guidance according to various exemplary embodiments.

Part 501 of the flow chart, illustrated vertically in the middle, shows the generation of hair color statistics, whereby a hair color information frequency distribution may be created in each case for the hair color statistics for a plurality of hair colors that are achievable by dyeing. For this purpose, a photograph of a model may be provided as a digital image, as described above. On the image, hair of the model may be colored in a hair color, for example in a hair color that is achievable by dyeing, for example by means of a coloring product, for example by means of a Schwarzkopf coloring product.

A color information item may be provided for each pixel of the digital image, and a color information frequency distribution may be created from a totality of the color information items for the plurality of pixels. Areas that do not correspond to a typical hair color information item for the hair color, for example background areas, skin areas, shadowed areas, or brightened areas, may be removed from the color information frequency distribution.

In various exemplary embodiments, a color information frequency distribution corrected in this way may form a hair color information frequency distribution (referred to as a color model in FIG. 5) which may be associated with the hair color that is displayed on the digital image. The hair color information frequency distribution may be associated, for example, with the coloring product (and vice versa).

Carrying out the creation of the hair color information frequency distribution for a plurality of hair colors, for example for a plurality of hair colors that are achievable by dyeing, may form the plurality of hair color information frequency distributions, which may be part of hair color statistics for hair colors that are achievable by dyeing.

It is also possible, as also described above, to generate hair color statistics for a plurality of common hair colors, analogously to generating the hair color statistics for hair colors that are achievable by dyeing, by using digital images of models having a common hair color, instead of the digital images of models depicting models with dyed hair.

The vertical part 502 of the flow chart 500 on the right may illustrate a method for computer-assisted hair coloring guidance in which, as described above, a provided image on which a plurality of hairs is visible is used for determining a coloring product with which the displayed hair color may be achieved. The image may be provided as a digital image for this purpose. If, for example, the image is provided by the user as a photograph from a magazine, it may be scanned, for example, for digitization. By use of a preliminary image color information frequency distribution, for example, as described above, the image may be analyzed for whether an image correction, for example an image enhancement (with respect to brightness, color cast, color saturation, for example), is necessary, and this may be carried out as needed. Based on the optionally corrected/enhanced digital image, an image color information frequency distribution as described above may be created. As described above, the most similar hair color information frequency distribution may be determined by comparing to the plurality of hair color information frequency distributions.

In various exemplary embodiments, the user may be presented with the hair color that is associated with the most similar hair color information frequency distribution, for example by showing him/her the image of the model who was used to create the most similar hair color information frequency distribution, or by showing him/her a package and/or a formulation of the coloring product that has been used to achieve the hair color displayed on the image that was used for creating the most similar hair color information frequency distribution. The presentation may take place, for example, by displaying on a screen.

The vertical part 503 of the flow chart 500 on the left may illustrate a method for computer-assisted hair coloring guidance in which, as described above, a provided image of the user on which a plurality of hairs is visible is used to give the user an impression of how he/she would look with a new hair color.

In various exemplary embodiments, the image of the user is provided in digital form for this purpose. The image may optionally be corrected, for example enhanced, as described above. In addition, for example by comparing an image color information frequency distribution, created for the digital image or a partial area of the digital image, to hair color statistics for a plurality of common hair colors as described above, an area (the hair region) may be determined in the digital image in which hair is displayed; i.e., other areas such as a background area, a shadowed area, a brightened area, etc. may be regarded as separate from the hair region. These areas may, for example, be further processed differently than the hair region. For example, recoloring of these separate areas may be dispensed with, or after the recoloring, the areas (such as the shadowed areas or the brightened areas, for example) may be superimposed once again on the recolored hair region.

In various exemplary embodiments, the user may select a desired new hair color, for example from the color model created according to the method illustrated in part 501, or based on a coloring product, for example a Schwarzkopf coloring product. The color model from part 501, which corresponds to the selected new hair color, for example the selected hair color information frequency distribution, may be used to color the pixels of the hair region of the digital image, displaying the user and his/her hair, in the new hair color.

Figure 6:
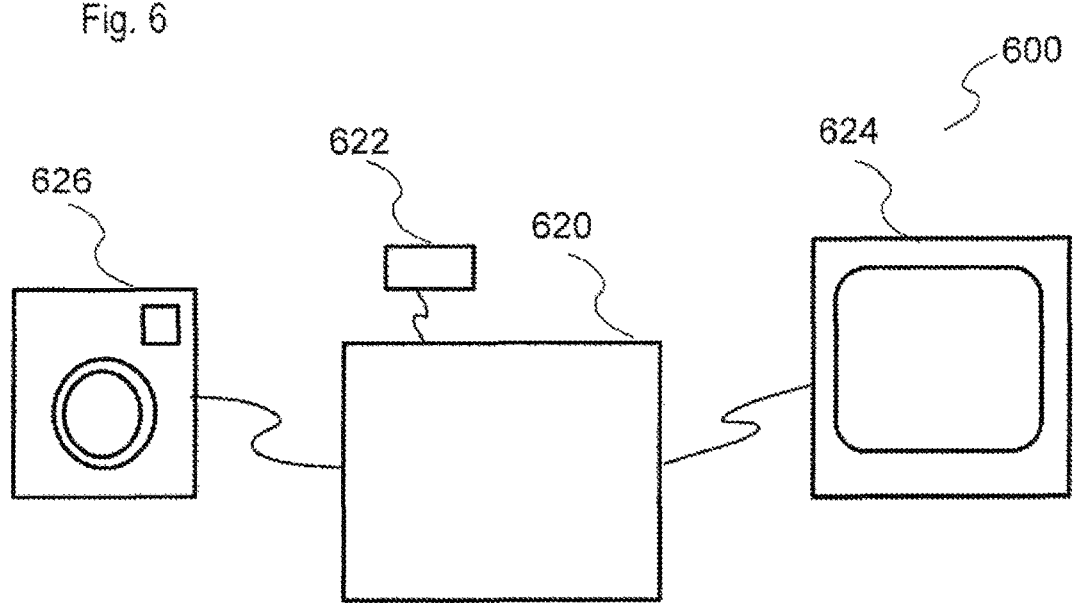
FIG. 6 shows a graphical illustration of a data processing device for carrying out computer-assisted hair coloring guidance according to various exemplary embodiments.

FIG. 6 is a graphical illustration of a data processing device 600 for carrying out computer-assisted hair coloring guidance according to various exemplary embodiments.

The data processing device 600 may be or include, for example, a smart phone, a tablet, a PC, a laptop, or any other given data processing device that is suitable for processing and displaying a digital image. The computer-assisted hair coloring guidance may be carried out by the data processing device 600 using an app, for example. Alternatively, some other computer-assisted method may be carried out for the hair coloring guidance.

In various exemplary embodiments, the data processing device 600 may include a processor 620. The processor 620 may, for example, be a microprocessor 620 of the data processing device 600 or may include such a microprocessor 620. The processor 620 may be configured for determining, in a digital image of a person on which hair is visible, a hair region surface in which hair is depicted, whereby the determining of the hair region surface may include determining an image color information frequency distribution that corresponds to a frequency distribution of at least one color information item for a plurality of pixels in the digital image, and comparing the image color information frequency distribution to hair color statistics, whereby the hair color statistics for a plurality of hair colors may in each case include at least one frequency distribution of at least one hair color information item.

In various exemplary embodiments, the data processing device 600 may include a data storage device 622. The data storage device may be an internal or external data store 622 of one of the aforementioned data processing devices 600 or may include such a data store 622. The data store 622 may be configured for storing data that are stored and/or retrieved in carrying out the computer-assisted coloring guidance, for example one or more of the statistics mentioned above in conjunction with the method for computer-assisted hair coloring guidance, for example the statistics of common hair colors, the statistics of hair colors that are achievable by dyeing, or the statistics of common skin colors.

In various exemplary embodiments, the data processing device 600 may include an image recording device 626. The image recording device 626 may include, for example, a camera, for example a digital camera of a smart phone or a tablet, a video camera of a smart phone or a tablet, a webcam, an image scanner, or some other device that is configured for supplying the processor 620 with a digital image for further processing, for example as described above in conjunction with the method, in the method for computer-assisted hair coloring guidance.

In various exemplary embodiments, the data processing device 600 may include a display device 624. The display device 624 may, for example, include a screen of a smart phone, a tablet, a PC, a laptop, or some other given data processing device 600.

The data processing device 600 may also be configured for providing further information to a user of the data processing device 600. For example, the display device 624 may be configured for recording information. For example, the display device may have a touch-sensitive screen 624, a so-called touchscreen 624. The user may, for example, mark areas that are displayed on the digital image on the touchscreen 624.

In various exemplary embodiments, the data processing device 600 may alternatively or additionally include some other input device (not illustrated) for providing information to the data processing device 600, for example a keyboard, a mouse, or the like.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A computer-assisted method for hair coloring guidance of a digitally imaged hair to a user, comprising: determining, by a data processing device of said computer, a hair region surface and skin surface area, in which hair is visibly depicted in the hair region surface, in a digital image of a person, including: determining an image color information frequency distribution that corresponds to a frequency distribution of at least one color information item for a plurality of pixels in the digital image; and comparing the image color information frequency distribution to hair color statistics that are achievable by dying, the hair color statistics for a plurality of hair colors in each case including at least one frequency distribution of at least one hair color information item; determining the statistically similar hair color information frequency distribution from the hair color statistics, the statistically similar hair color information frequency distribution being the frequency distribution from the plurality of hair color information frequency distributions that is statistically similar to the image color information frequency distribution; and associating with the hair region surface a plurality of pixels in the image, whose at least one color information item in each case corresponds to at least one color information item in the statistically similar hair color information frequency distribution: comparing the image color information frequency distribution to skin color statistics, whereby the skin color statistics for a plurality of skin colors commonly occurring in humans in each case includes at least one frequency distribution of at least one skin color information item; determining a statistically similar skin color information frequency distribution from the skin color statistics, the statistically similar skin color information frequency distribution being the frequency distribution from the plurality of skin color information frequency distributions that is statistically similar to the image color information frequency distribution; and associating at least one pixel in the digital image, whose at least one color information item of at least one color information item in the skin color information items corresponds to the statistically similar skin color information frequency distribution, with a skin area surface, the skin area surface being different from the hair region surface; recoloring the plurality of pixels in the hair region surface corresponding to a plurality of new color information items, a new color information item being associated with each pixel of the plurality of pixels in the hair region surface, and the plurality of new color information items being selected in such a way that their frequency distribution corresponds to the hair color information frequency distribution for the selected achievable hair color; displaying the recoloring on a display of said data processing device, wherein the data processing device is selected from the group consisting of a smart phone, a tablet, and a laptop; and presenting to the user at least one dye that is associated with the statistically similar hair color information frequency distribution.

2. The method according to claim 1,
wherein the hair color statistics are statistics of common hair colors, and the plurality of hair colors is a plurality of hair colors commonly occurring in humans.

3. The method according to claim 1, further comprising:
determining a shadowed hair region surface, wherein at least one pixel, which is associated with the hair region surface and whose brightness is close to or at a minimum brightness of the plurality of pixels in the hair region surface, is associated with the shadowed hair region surface; and
determining a brightened hair region surface, wherein at least one pixel, which is associated with the hair region surface and whose brightness is close to or at a maximum brightness of the plurality of pixels in the hair region surface, is associated with the brightened hair region surface.

4. The method according to claim 3, further comprising:
creating a shadow-light mask, including:
- determining an average brightness in the hair region surface, the average brightness in the hair region surface corresponding to a statistical average value of the brightnesses of the plurality of pixels in the hair region surface;
- for the at least one pixel in the shadowed hair region surface and in the brightened hair region surface in each case, determining a brightness difference value between the brightness of the at least one pixel and the average brightness in the hair region surface; and
- combining the brightness difference values to obtain the shadow-light mask.

5. The method according to claim 1, further comprising: specifying a partial area within the digital image by a user.

6. The method according to claim 5,
wherein the specifying of the partial area by the user comprises marking the partial area on the image of the person displayed on a screen.

7. The method according to claim 5,
wherein the frequency distribution in the partial area is ascertained for determining the image color information frequency distribution.

8. The method according to claim 1,
wherein the determining of the hair region surface further comprises:
incorporating a spatial structure that is recognized in the image of the person.

9. The method according to claim 1, further comprising:
prior to determining the hair region surface, generating statistics of color information items and/or lightness information items of the plurality of pixels in the overall image;
determining the need for an image correction; and
making an image correction when the determination of the need for an image correction indicates that an image correction should be made.

10. The method according to claim 9,
wherein the image correction includes a lightness correction and/or a color correction.

11. The method according to claim 4, further comprising:
superimposing the recolored hair region surface on the shadow-light mask, the superimposing of the hair region surface on the shadow-light mask corresponding to brightening of at least one pixel within the brightened hair region surface by the brightness difference value that is associated with this pixel, and darkening of at least one pixel within the shadowed hair region surface by the brightness difference value that is associated with this pixel.

12. The method according to claim 1,
wherein the color information is information concerning a shade.

13. The method according to claim 12,
wherein the shade is parameterized in a media-independent color space.

14. The method according to claim 13,
wherein the media-independent color space is an L*a*b* color space.

15. The method according to claim 1,
wherein the dye is a coloring product from a product line.

* * * * *